United States Patent
Gentry, Jr. et al.

(10) Patent No.: US 8,595,481 B1
(45) Date of Patent: Nov. 26, 2013

(54) METHOD, MANUFACTURE, AND APPARATUS FOR CENTRALIZED WIFI ENCRYPTION FOR GUEST

(75) Inventors: Denton Eugene Gentry, Jr., Fremont, CA (US); Karl Robert Garcia, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 57 days.

(21) Appl. No.: 13/475,734

(22) Filed: May 18, 2012

(51) Int. Cl.
*H04L 29/06* (2006.01)
(52) U.S. Cl.
USPC .......................................... 713/153; 713/168
(58) Field of Classification Search
USPC .......................................... 713/153, 154, 168
See application file for complete search history.

(56) References Cited

U.S. PATENT DOCUMENTS

| | | | | |
|---|---|---|---|---|
| 7,174,456 | B1 * | 2/2007 | Henry et al. | 713/158 |
| 7,362,865 | B2 * | 4/2008 | Karp | 380/270 |
| 7,451,316 | B2 * | 11/2008 | Halasz et al. | 713/168 |
| 8,085,740 | B2 * | 12/2011 | Zhang et al. | 370/338 |
| 2005/0216519 | A1 * | 9/2005 | Mayo et al. | 707/200 |

* cited by examiner

*Primary Examiner* — Ali Abyaneh
(74) *Attorney, Agent, or Firm* — Honigman Miller Schwartz and Cohn LLP (57) ABSTRACT

An Access Point receives an encrypted data frame from a client device, and determines whether the encrypted data frame is a guest frame. If it determined that the frame is a guest frame, the Access Point transmits the encrypted data frame to a server for decryption by the server, and determines whether to transmit an ACK to the client device based on the encrypted data frame. Otherwise, the Access Point decrypts the encrypted data frame, and determines whether to transmit an ACK to the client device.

16 Claims, 6 Drawing Sheets

METHOD, MANUFACTURE, AND APPARATUS FOR CENTRALIZED WIFI ENCRYPTION FOR GUEST

TECHNICAL FIELD

The invention is related to wireless networks, and in particular, but not exclusively, to a method, manufacture, and apparatus for an Access Point (AP) which operates as a thick AP for owner frames and acts as a thin AP for guest frames.

BACKGROUND

Wireless networking technology allows computers to communicate wirelessly, using network protocols such as a protocol in the IEEE 802.11 family of protocols. There are two types of wireless networks: ad-hoc wireless networks, in which each computer in the network can communicate directly with each other computer in the wireless network; and wireless networks that make use of one or more Access Point(s). An Access Point (AP) acts a bridge for wireless devices within range of the AP and to a wired network to which the AP is connected.

There are two distinct types of Access Points: thick APs and thin APs. A thick AP is a layer 2 device that performs functions, including functions such as all Media Access Control (MAC) functions locally, including authentication of clients. A thin AP is not itself a level 2 or level 3 device, but instead communicates via a low-level protocol to a controller. Frames received by the thin. AP are tunneled to the controller for processing. For thin APs, virtually all functions, such as virtually all MAC functions, are performed by the controller rather than the AP.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "signal" means at least one current, voltage, charge, temperature, data, or other signal.

Briefly stated, the invention is related to an Access Point that receives an encrypted data frame from a client device, and determines whether the encrypted data frame is a guest frame. If it determined that the frame is a guest frame, the Access Point transmits the encrypted data frame to a server for decryption by the server, and determines whether to transmit an ACK to the client device based on the encrypted data frame. Otherwise, the Access Point decrypts the encrypted data frame, and determines whether to transmit an ACK to the client device.

Illustrative Operating Environment

Figure 1:
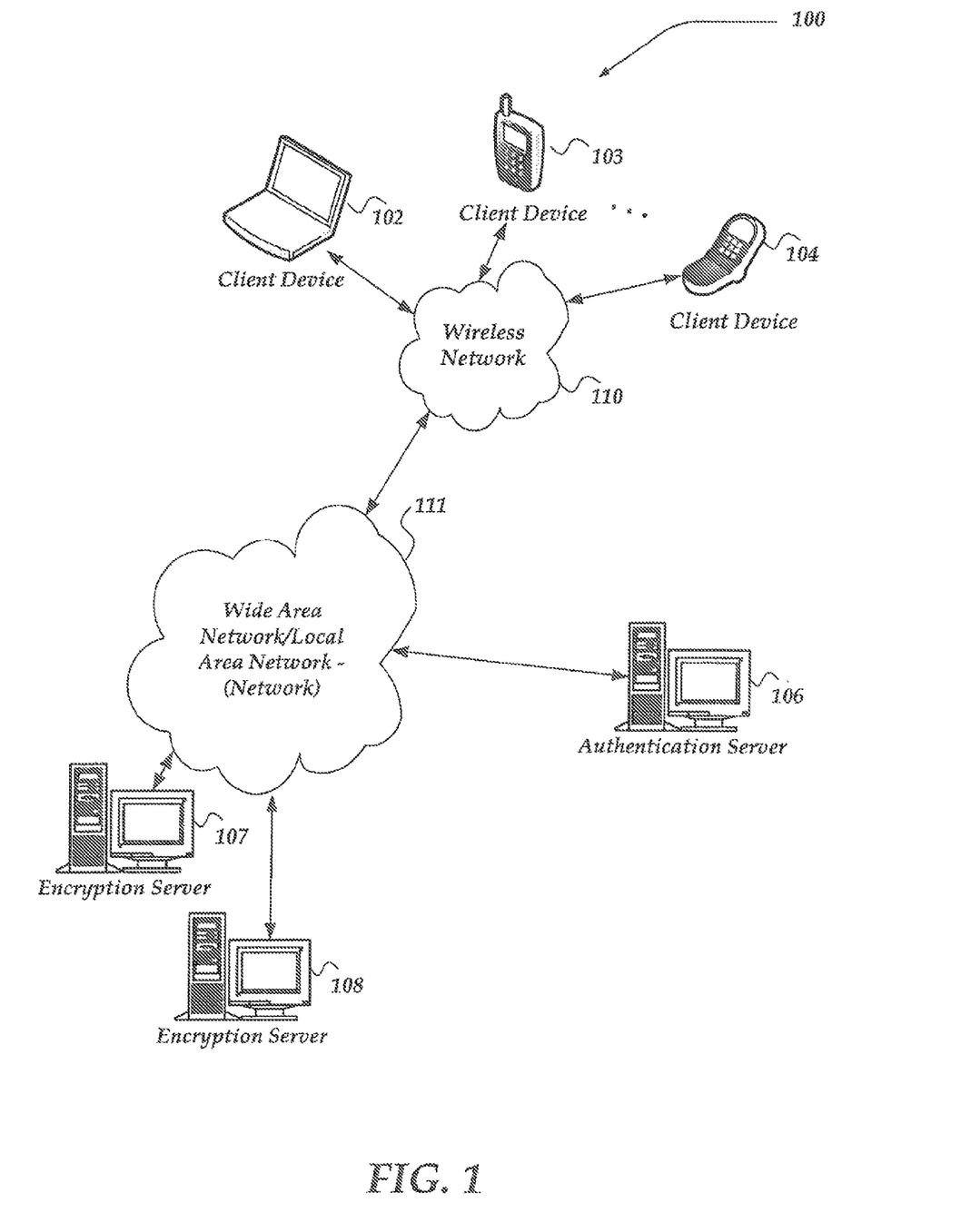
FIG. 1 illustrates a system diagram of one embodiment of an environment in which the embodiments of the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs") wide area networks ("WANs")-(network) 111, wireless network 110, client devices 102-104, encryption servers 107-108, and authentication server 106.

One embodiment of client devices 102-104 is described in more detail below in conjunction with FIG. 2. Generally, however, client devices 102-104 may include virtually any portable computing device capable of receiving and sending a message over a network, such as wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities. A client device such as 102-104 that has connected to wireless network 110 may make use of web services.

Wireless network 110 is configured to couple client devices 102-104 and its components with network 111. Wireless network 110 contains at least one Access Point (not shown in FIG. 1). Wireless network 110 may include any of a variety of wireless sub-networks that may further overlay stand-alone ad-hoc networks, and the like. Such sub-networks may include mesh networks, Wireless LAN (WLAN) networks, cellular networks, and the like. Wireless LAN (WLAN) networks may employ wireless protocols and technologies such as the IEEE 802.11 family of standards and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Network 111 is configured to couple network devices with other computing devices, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Servers 106-108 are network devices. Devices that may operate as servers 106-108 include various network devices, including, but not limited to personal computers, desktop computers, multiprocessor systems, microprocessor-based or programmable consumer electronics, network PCs, server devices, network appliances, and the like. It should be noted that while various devices are shown in a particular quantity, for example, encryption servers 107 and 108 are shown as two devices, in various embodiments there may a different quantity of such devices, such as more be only one encryption server or three or more encryption servers. Thus, the invention is not to be construed as being limited to a single environment and other configurations, and architectures are also envisaged. Authentication server 106 is arranged to authenticate clients when frames are forwarded to authentication server 106 for authentication. Encryption servers 107 and 108 are arranged to perform encryption of frames forwarded to the encryption servers for encryption.

Illustrative Client Device

Figure 2:
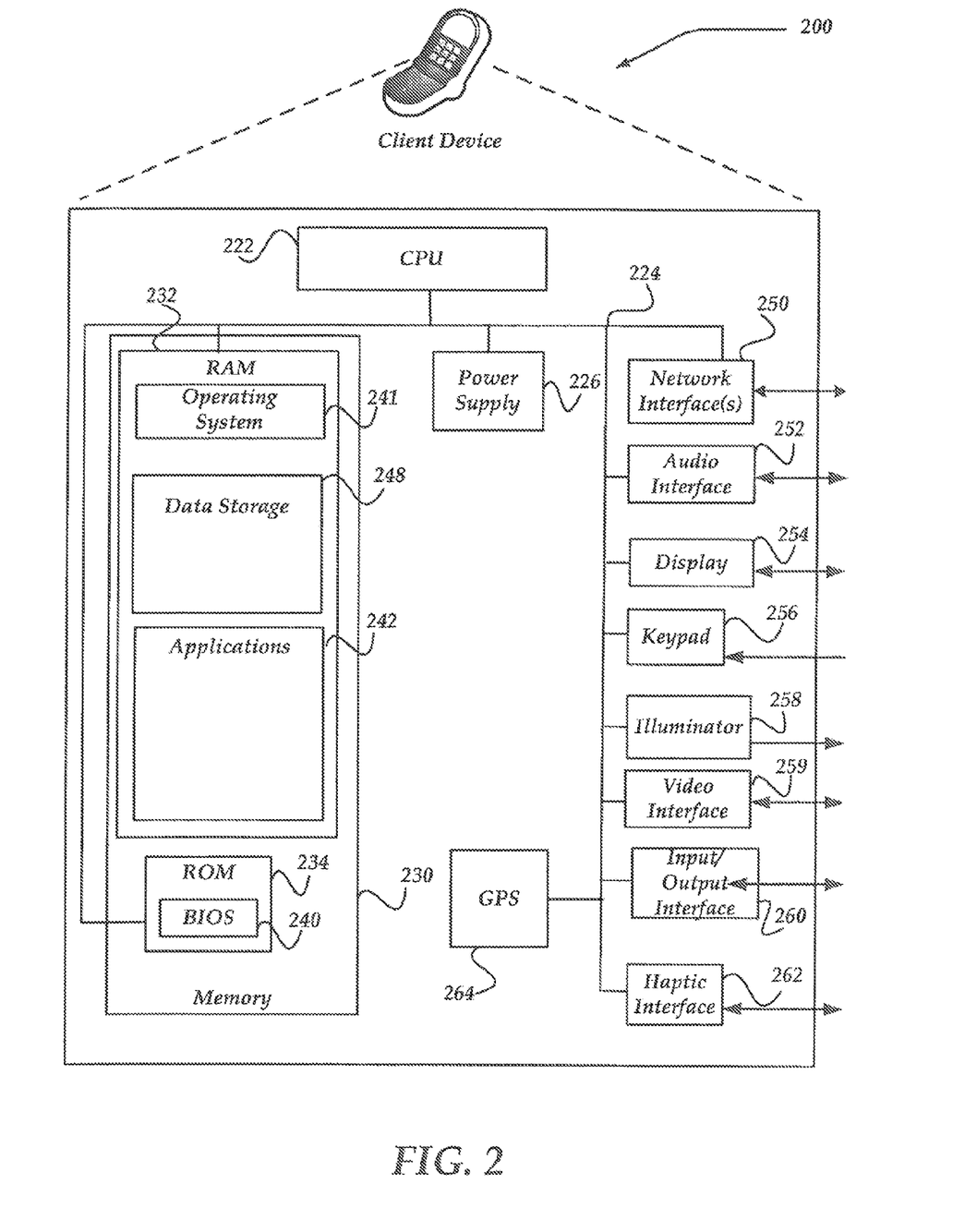
FIG. 2 shows one embodiment of a client device that may be included in the system of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), wireless protocols and technologies such as the IEEE 802.11 family of standards and the like, time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Android™, Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Further, as discussed in greater detail below, applications 242 may include an application that generates per-user-per devices certification for communication an Access Point for accessing a wireless network.

Illustrative Network Device

Figure 3:
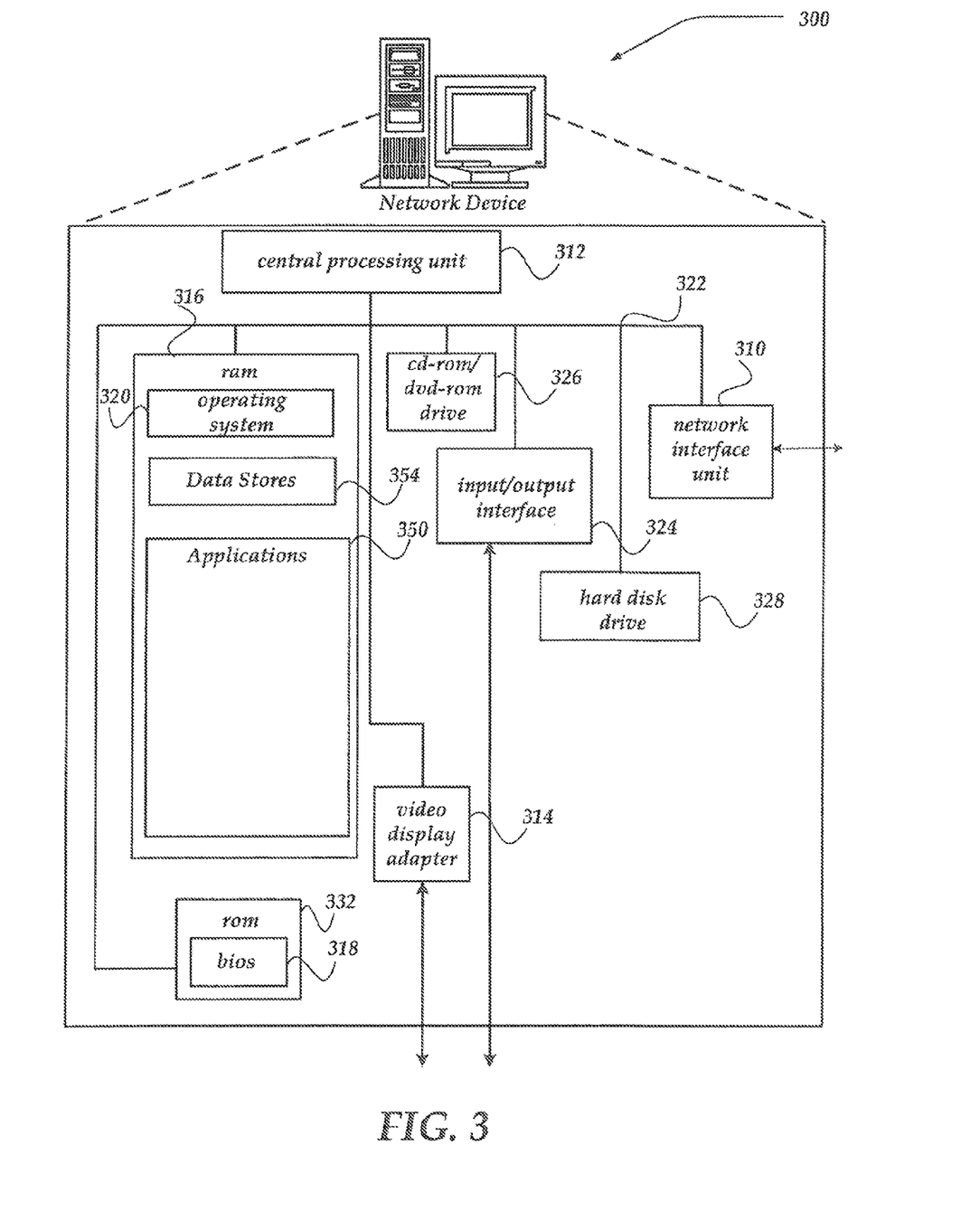
FIG. 3 shows one embodiment of a network device that may be included in the system of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, one of encryption servers 107-108, authentication server 106, and/or Access Point 413.

Network device 300 may include processing unit 312, video display adapter 314, and a mass memory, all in communication with each other via bus 322. The mass memory generally includes RAM 316, ROM 332, and one or more permanent mass storage devices, such as hard disk drive 328, tape drive, and/or optical drive. The mass memory may store operating system 320 for controlling the operation of network device 300. Any general-purpose operating system may be employed. Basic input/output system ("BIOS") 318 may also be provided for controlling the low-level operation of network device 300. As illustrated in FIG. 3, network device 300 also can communicate with the Internet, or some other communications network, via network interface unit 310, which may be constructed for use with various communication protocols including the TCP/IP protocol. Network interface unit 310 is sometimes known as a transceiver, transceiving device, or network interface card (NIC).

The mass memory as described above illustrates another type of computer-readable/processor-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

Data stores 354 may include a database, text, spreadsheet, folder, file, or the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 may be loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, authentication programs, security programs, SMS message servers, IM message servers, email servers, account managers, and so forth.

Various embodiments of network device 300 may include further applications 350 to perform various functions discussed herein and/or discussed with regard to steps as illustrated in the flowcharts shown below. These stored applications are processor-executable code encoded on a processor-readable medium, which, when executed by CPU 312, enable actions to performed in accordance with the processor-executable code.

Figure 5:
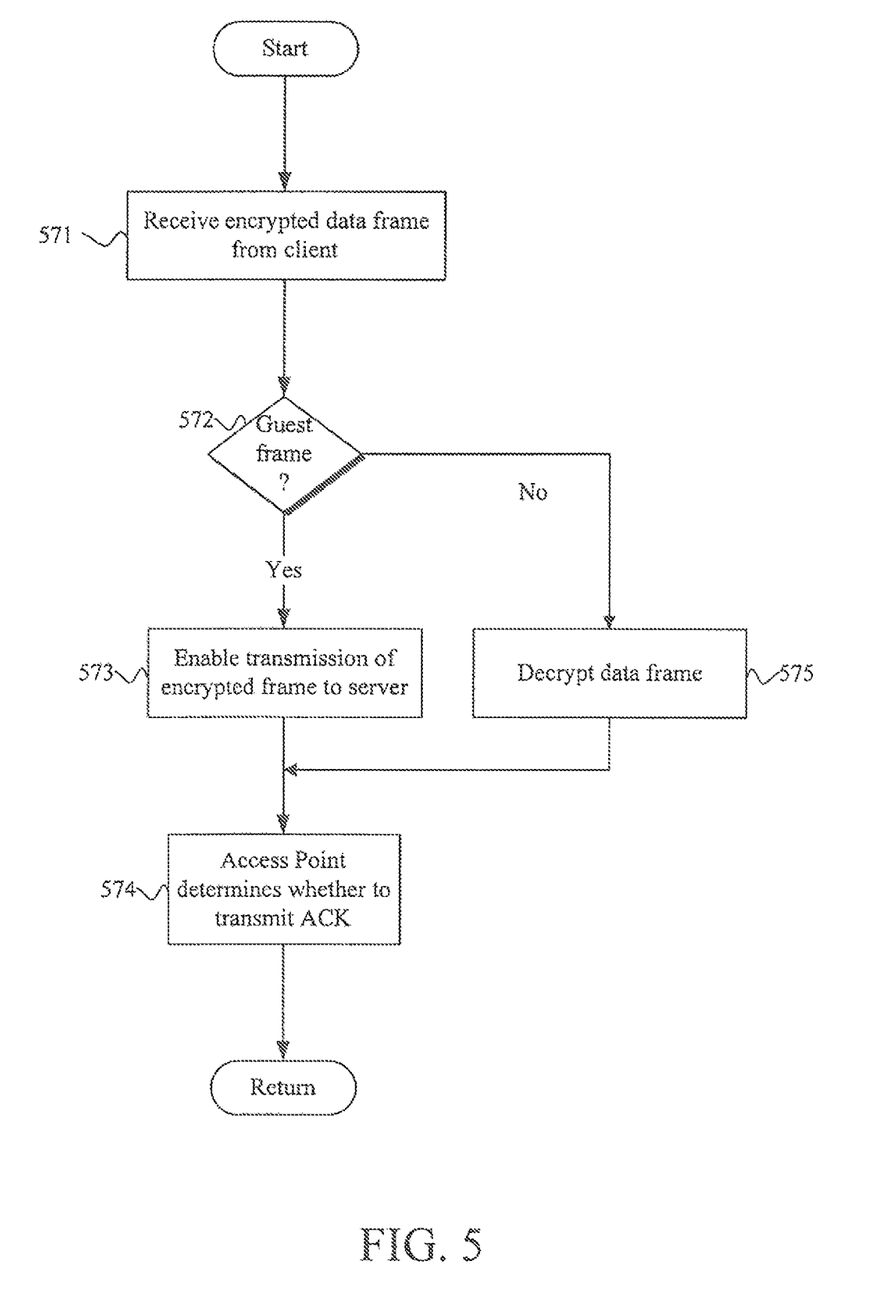
FIG. 5 illustrates a flow chart of an embodiment of a process that may be performed by an embodiment of the Access Point of FIG. 4.

Although various embodiments have discussed the performed of actions implemented in software, for example by means of processor-executable code encoded on a processor-readable medium, which, when executed by CPU 312, enable actions to performed in accordance with the processor-executable code, in various embodiments, actions, such as those performed by an Access Point as illustrated in FIG. 5 below, may in some embodiments, rather than being performed only by executed software, may instead be performed based on hardware only, or by a combination of hardware and software.

Generalized System and Operation

Figure 4:
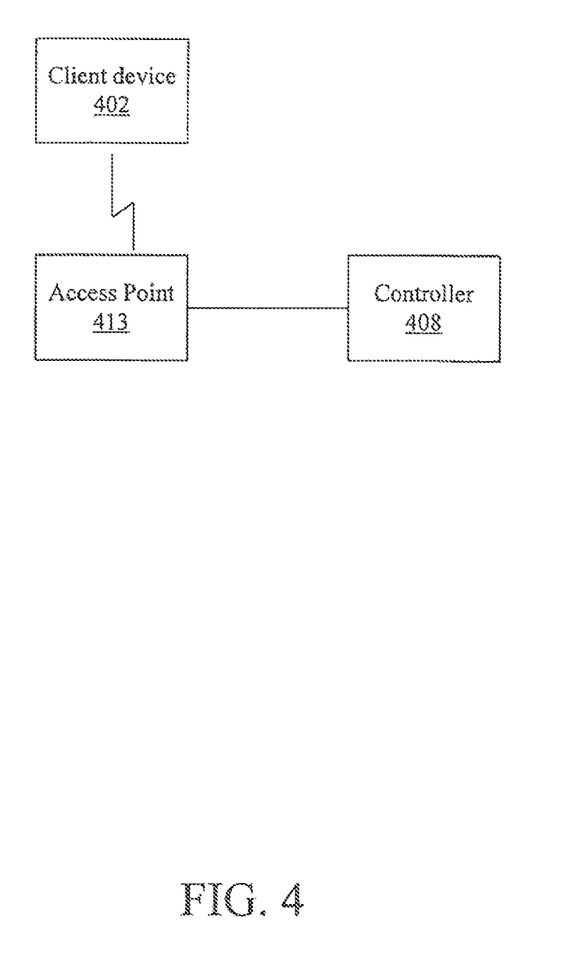
FIG. 4 shows a block diagram of an embodiment of a system that includes an embodiment of a client device, and Access Point, and a controller.

The operation of certain aspects of the invention will now be described with respect to FIGS. 4-5. FIG. 4 shows an embodiment of part or all of a system, and FIG. 5 shows a process which may, in some embodiments, be performed by Access Point 413 of FIG. 4.

FIG. 4 shows a block diagram of an embodiment of system 400. System 400 includes an embodiment of client device 402, Access Point 413, and controller 408. Controller 408 may include one or more servers, such as servers 106-108 of FIG. 1. Of course, many intermediate network devices may be included in the network between access point 413 and controller 408. Access Point 413 is accessible via wireless network to the owner of the device, who maintains Access Point 413 at their premises, but Access Point 413 is also accessible to guests.

Access Point 413 may include a transceiver that is arranged to receive and transmit information over a wireless network, and a processing unit that is arranged to perform actions, such as those illustrated by process 570 of FIG. 5, discussed in greater detail below. In some embodiments, the processing unit includes one or more processors that execute processor-executable code encoded in a tangible processor-readable storage medium, thereby performing the actions illustrated by process 570 of FIG. 5. In other embodiments, processing unit 570 is implemented solely in hardware, or by a combination of hardware and software.

FIG. 5 illustrates a flow chart of an embodiment of process 570, which may be performed by an embodiment of the Access Point 413 of FIG. 4. After a start block, the process proceeds to block 571, where an encrypted data frame from is received from a client device. The process then advances to decision block 472, where a determination is made as to whether or not the encrypted data frame is a guest frame. If so, the process proceeds to block 573, where transmission of the encrypted data frame to a server for decryption by the server is enabled. The process then moves to block 574, where the Access Point makes a determination as to whether to transmit an ACK to the client device based on the encrypted data frame. The process then advances to a return block, where other processing is resumed.

If the determination at decision block 572 is negative, the process proceeds to block 575, where the encrypted data frame is decrypted. The process then moves to block 574.

Illustrative System Embodiment

Figure 6:
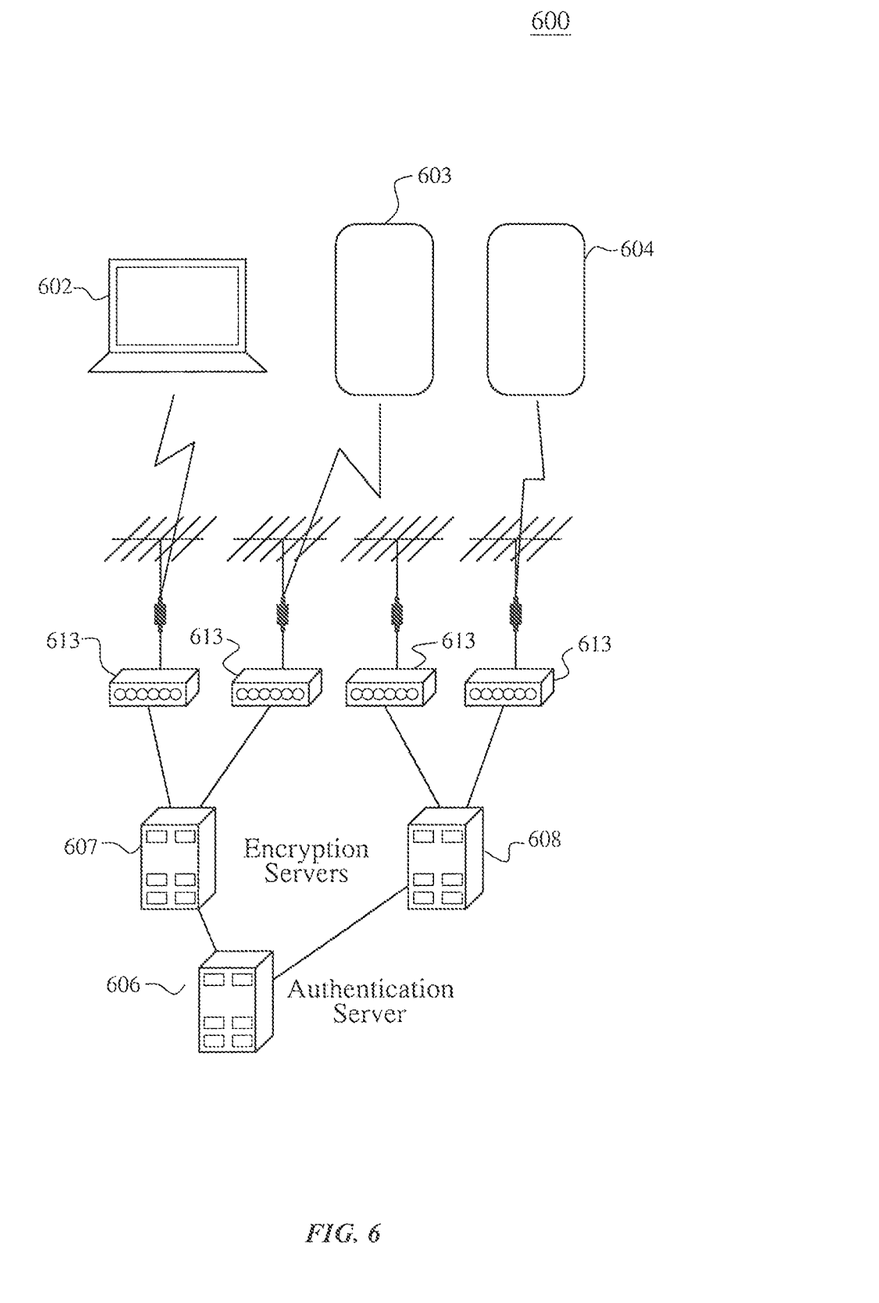
FIG. 6 shows a block diagram of an embodiment of the system of FIG. 4, in accordance with aspects of the invention.

FIG. 6 shows a block diagram of an embodiment of system, which may be employed by as an embodiment of system 400 of FIG. 4. System 600 includes client devices 602-604, Access Points 613, Encryption Servers 607 and 608, and Authentication Server 606.

System 600 enables wireless network access to two distinct groups of people: the owner(s) of the wireless gear, and guests. The owner(s) may live in the location, such as a house or apartment, or may be business owners or the like who have the wireless gear in their place of business, or may be managers of public venues who have the wireless gear installed in the public venue. The guests are users of wireless network who may or may not be known to the owner(s). System 600 contains security to guard against the possibility that some guests may be malicious.

System 600 uses certificates for authentication. One certificate authenticates the network to the client, as a defense against phishing Access Points (APs). The other certificate authenticates the user to the network. In some embodiments, issued certificate could be associated with the MAC address of the device; the encryption servers 607-608 see the raw 802.11 frame, and can reject an authentication attempt from the wrong MAC address.

In some embodiments, client devices (e.g., 602-604) require installation of an application to use the wireless network, where the application supplies certificates. In some embodiments, the client application generates per-user-per devices certification. In some embodiments, the certificate service may be available publicly (e.g., open to the entire Internet). In some embodiments, the certificate request contains user credentials and a MAC address.

Access Point (AP) 613 advertises two service set identifiers (SSIDs): one for Guest, one for the Owner. AP 613 handles Owner SSID as a thick AP, in the normal manner in which a thick AP functions.

In contrast, Access Point 613 handles Guest SSID as a thin AP, while performing some time-sensitive functions locally, as explained in greater detail below. With regard to Guest SSID, the Access Point is not given the encryption keys for sessions, and cannot decrypt packets. AP 613 sends frames to servers 606-608 via tunnel, with an ID indicating which session this is and which AP this is. Servers 606-608 handle all authentication, encryption, and decryption, for the Guest SSID. In some embodiments, AP 613 encapsulates the encrypted 802.11 frame in a header (e.g., a generic routing encapsulation [GRE] header) to send to the encryption servers 607-608 via a tunneling protocol such as GRE, which may require fragmentation. Servers 606-608 decrypt the guest frames sent to them, and then route the packets to their destination.

Although all authentication, encryption, and decryption of guests frames are handled by servers 606-608 rather than by Access Point 613 itself, some functions are performed locally by Access Point 613 for guest frames. For example, Beacon frames and responses to Probes sent by clients for guest frames are transmitted locally by AP 613. Request to Send/Clear to Send (RTS/CTS) for guest frames are handled locally by AP 613. Acknowledgement (ACK) generation is handled locally by AP 613 for guest frames.

Although guest frames are handled by AP 613 as a thin AP, the functions discussed above are performed locally by AP 613 for guest frames. Conventional thin APs do not perform these functions locally, but for conventional APs, the controller is typically within the same building as the AP. For system 600, the servers 606-608 may be at a sufficient distance from Access Point 613 that the speed of light delay is non-trivial, and the delay may be too large to meet the timing constraints required by the protocol being employed.

For guest frames, ACK generation is done by AP 613 without decrypting the frames. In some embodiments, for the ACK determination for guest frames, AP 613 may check encrypted headers, and perform cyclic redundancy check (CRC), to determine whether or not to send back an ACK.

In some embodiments, AP 613 employs traffic shaping to ensure that the Guest WLAN gets its own bandwidth allocation.

In some embodiment, encryption servers 606-607 may be able to store sessions for subscribers who have joined a Guest WLAN, and allow load balancing amongst encryption servers 606-607. In some embodiments, encryption servers 607-608 may be tracking many sessions simultaneously. Each session has a separate encryption key. Encryptions 607-108 look at the tunnel of tunneled frames sent to them and look at the MAC addresses of the original frame to determine which session this is, and then find the encryption key and decrypt the frame. Once the frame is decrypted, it can be routed as normal.

When AP 613 receives an encrypted data frame, it determines whether the frame is a guest frame or an owner frame. AP 613 may make this determination by looking at the MAC address in the header, which is unencrypted. AP 613 may check to see whether it has an encryption key for the MAC address of the frame. The frames that are for the owner, either will have a key, or will be able to decrypt them and then handle them there. If the MAC address is not a MAC address that AP 613 has a key for, then the frame is a guest frame. As discussed above, if it is an owner frame, AP 613 acts as a thick AP with respect to the frame and performs functions, including all MAC functions of the frame locally, including decrypting the frame. If the frame is a guest frame, AP 613 does not decrypt the frame locally, but acts as a thin AP to the frame, while performing certain time-sensitive functions locally, as discussed above.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method comprising:
at an Access Point:
receiving an encrypted data frame from a client device;
making a determination as to whether the encrypted data frame is a guest frame by checking a media access control address of the encrypted data frame and determining whether or not the Access Point has an encryption key corresponding to the media access control address of the encrypted data frame;
when the encrypted data frame is a guest frame:
transmitting the encrypted data frame to a server for decryption and authentication by the server; and
employing the Access Point to make a determination as to whether to transmit an acknowledge to the client device based on the encrypted data frame; and
when the encrypted data frame is not a quest frame:
decrypting and authenticating the encrypted data frame at the Access Point; and
employing the Access Point to make a determination as to whether to transmit an acknowledge to the client device.

2. The method of claim 1, wherein:
when the encrypted data frame is a guest frame,
the Access Point transmits the data frame without decrypting the data frame at the Access Point and without authenticating the data frame at the Access Point; and
when the encrypted data frame is not a quest frame, the Access Point authenticates the data frame at the Access Point after decrypting the data frame.

3. The method of claim 1, further comprising employing the Access Point to advertise a first service set identifier for guests and to advertise a second service set identifier for owners, wherein the first service set identifier is distinct from the second service set identifier.

4. The method of claim 1, wherein transmitting the encrypted data frame to a server for decryption and authentication by the server includes encapsulating the encrypted data frame within a header in accordance with a tunneling protocol and transmitting the encapsulated frame to the server.

5. The method of claim 1, further comprising, when the encrypted data frame is a guest frame, employing the Access Point to make a determination as to whether to transmit an acknowledge to the client device based on the encrypted data frame includes performing a cyclic redundancy check on the encrypted data frame.

6. The method of claim 1, further comprising:
when the encrypted data frame is a guest frame, performing request to send and clear to send functions locally with the Access Point; and
when the encrypted data frame is not a guest frame, performing a request to send and clear to send functions locally with the Access Point.

7. The method of claim 1, further comprising:
when the frame is a guest frame, transmitting beacon frames and responses to probes from the client device locally with the Access Point; and
when the encrypted data frame is not a quest frame, transmitting beacon frames and responses to probes from the client device locally with the Access Point.

8. A device comprising:
an Access Point comprising:
a transceiver receiving and transmitting information over a wireless network; and
a processing unit performing actions, the actions including:
receiving an encrypted data frame from a client device;
making a determination as to whether the encrypted data frame is a guest frame by checking a media access control address of the encrypted data frame and determining whether or not the Access Point has an encryption key corresponding to the media access control address of the encrypted data frame;
when the encrypted data frame is a guest frame:
transmitting the encrypted data frame to a server for decryption and authentication by the server; and
employing the Access Point to make a determination as to whether to transmit an acknowledge to the client device based on the encrypted data frame; and
when the encrypted data frame is not a quest frame:
decrypting and authenticating the encrypted data frame at the Access Point; and employing the Access Point to make a determination as to whether to transmit an acknowledge to the client device.

9. The device of claim 8, wherein:
when the encrypted data frame is a guest frame, the Access Point transmits the data frame without encrypting the data frame at the Access Point and without authenticating the data frame at the Access Point; and
when the encrypted data frame is not a guest frame, the Access Point authenticates the data frame at the Access Point after decrypting the data frame.

10. The device of claim 8, wherein the Access Point advertises a first service set identifier for guests and a second service set identifier for owners, wherein the first service set identifier is distinct from the second service set identifier.

11. A manufacture, including a non-transitory processor-readable storage medium having processor-executable code encoded therein, which when executed by one or more processors, enables actions, comprising:
at an Access Point:
receiving an encrypted data frame from a client device;
making a determination as to whether the encrypted data frame is a guest frame by checking a media access control address of the encrypted data frame and determining whether or not the Access Point has an encryption key corresponding to the media access control address of the encrypted data frame;
when the encrypted data frame is a guest frame:
transmitting the encrypted data frame to a server for decryption and authentication by the server; and
employing the Access Point to make a determination as to whether to transmit an acknowledge to the client device based on the encrypted data frame; and
when the encrypted data frame is not a quest frame:
decrypting and authenticating the encrypted data frame at the Access Point; and
employing the Access Point to make a determination as to whether to transmit an acknowledge to the client device.

12. The manufacture of claim 11, wherein:
when the encrypted data frame is a guest frame, the Access Point transmits the data frame without decrypting the data frame at the Access Point and without authenticating the data frame at the Access Point; and
when the encrypted data frame is not a quest frame, the Access Point authenticates the data frame at the Access Point after decrypting the data frame.

13. The manufacture of claim 11, wherein the actions further comprise employing the Access Point to advertise a first service set identifier for guests and to advertise a second service set identifier for owners, wherein the first service set identifier is distinct from the second service set identifier.

14. A system comprising:
a client computing device transmitting an encrypted data frame;
an Access Point performing actions, the actions including:
receiving an encrypted data frame from the client computing device;
making a determination as to whether the encrypted data frame is a guest frame by checking a media access control address of the encrypted data frame and determining whether or not the Access Point has an encryption key corresponding to the media access control address of the encrypted data frame;
when the encrypted data frame is a guest frame:
transmitting the encrypted data frame to the controller for decryption and authentication by the server; and
employing the Access Point to make a determination as to whether to transmit an acknowledge to the client computing device based on the encrypted data frame; and
when the encrypted data frame is not a quest frame:
decrypting and authenticating the encrypted data frame at the Access Point; and
employing the Access Point to make a determination as to whether to transmit an acknowledge to the client computing device;
a controller including at least one server device, the controller performing actions including:
when the controller receives an encrypted data frame from the Access Point:
decrypting the encrypted data frame; and
performing authentication for the encrypted data frame.

15. The system of claim 14, wherein:
when the encrypted data frame is a guest frame, the Access Point transmits the data frame without encrypting the data frame at the Access Point and without authenticating the data frame at the Access Point; and
when the encrypted data frame is not a quest frame, the Access Point authenticates the data frame at the Access Point after decrypting the data frame.

16. The system of claim 14, wherein the Access Point advertises a first service set identifier for guests and a second service set identifier for owners, wherein the first service set identifier is distinct from the second service set identifier.

* * * * *

UNITED STATES PATENT AND TRADEMARK OFFICE
CERTIFICATE OF CORRECTION

PATENT NO.        : 8,595,481 B1
APPLICATION NO.   : 13/475734
DATED             : November 26, 2013
INVENTOR(S)       : Denton Eugene Gentry, Jr.

It is certified that error appears in the above-identified patent and that said Letters Patent is hereby corrected as shown below:

In the Claims
    At column 9, claim number 1, line number 62, please delete "quest" and insert --guest--;

At column 10, claim number 2, line number 7, please delete "quest" and insert --guest--;

At column 10, claim number 7, line number 40, please delete "quest" and insert --guest--;

At column 10, claim number 8, line number 65, please delete "quest" and insert --guest--;

At column 11, claim number 11, line number 35, please delete "quest" and insert --guest--.

Signed and Sealed this
Fifteenth Day of April, 2014

Michelle K. Lee
*Deputy Director of the United States Patent and Trademark Office*